United States Patent
Eberle et al.

(10) Patent No.: US 12,071,176 B2
(45) Date of Patent: Aug. 27, 2024

(54) PASSENGER CAR

(71) Applicant: Bayerische Motoren Werke Aktiengesellschaft, Munich (DE)

(72) Inventors: Niklas Eberle, Munich (DE); Michael Floer, Munich (DE); Liudmila Lauer, Augsburg (DE); Sabine Vethacke, Hoehenkirchen-Siegertsbrunn (DE); Ferhat Yueksel, Augsburg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/760,563

(22) PCT Filed: Aug. 19, 2020

(86) PCT No.: PCT/EP2020/073208
§ 371 (c)(1),
(2) Date: Mar. 15, 2022

(87) PCT Pub. No.: WO2021/052699
PCT Pub. Date: Mar. 25, 2021

(65) Prior Publication Data
US 2022/0388576 A1  Dec. 8, 2022

(30) Foreign Application Priority Data
Sep. 16, 2019 (DE) .................... 10 2019 124 869.8

(51) Int. Cl.
*B62D 25/06* (2006.01)
*B60J 1/00* (2006.01)
*B60J 7/043* (2006.01)

(52) U.S. Cl.
CPC .............. *B62D 25/06* (2013.01); *B60J 1/007* (2013.01); *B60J 7/043* (2013.01)

(58) Field of Classification Search
CPC .................................................... B62D 29/005
(Continued)

(56) References Cited

U.S. PATENT DOCUMENTS

| 2,733,096 A | * | 1/1956 | Waterhouse et al. .. B62D 23/00 296/202 |
| 9,862,255 B2 | | 1/2018 | Nania |

(Continued)

FOREIGN PATENT DOCUMENTS

| CN | 105882760 A | 8/2016 |
| CN | 109501560 A | 3/2019 |

(Continued)

OTHER PUBLICATIONS

Text DE102016222116 (Year: 2018).*
(Continued)

*Primary Examiner* — Dennis H Pedder
(74) *Attorney, Agent, or Firm* — Crowell & Moring LLP

(57) ABSTRACT

A passenger car has a self-supporting body, which has a roof opening. The roof opening is outwardly delimited in the vehicle transverse direction by lateral roof rails of the body and in the vehicle longitudinal direction by a transverse element of the body connected to the roof rails. A roof apparatus has a frame and at least one roof element that overlaps with at least part of the roof opening. The roof element is retained on the frame directly and on the body by way of the frame. The frame has a transverse frame part, on which the roof element is retained directly, the transverse frame part being connected directly to the transverse element of the body.

11 Claims, 1 Drawing Sheet

Figure 1:
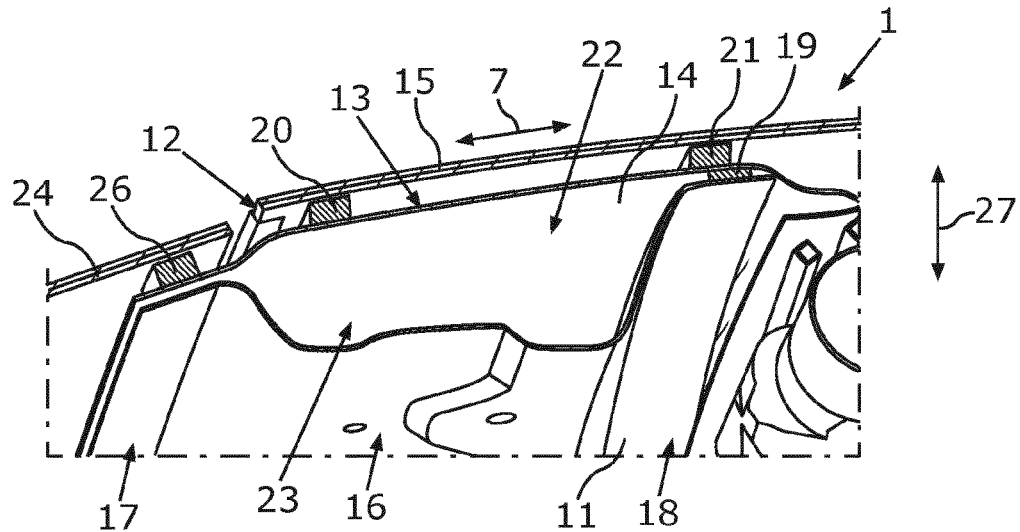

(58) Field of Classification Search
USPC .............................. 296/210, 215, 23.01, 2, 3
See application file for complete search history.

(56) References Cited

U.S. PATENT DOCUMENTS

| | | | |
|---|---|---|---|
| 2008/0106124 A1* | 5/2008 | Snider | .................... B60J 7/0015 |
| | | | 296/215 |
| 2011/0101731 A1 | 5/2011 | Legler et al. | |
| 2016/0159404 A1 | 6/2016 | Lee et al. | |
| 2016/0236722 A1 | 8/2016 | Nakamura et al. | |
| 2018/0126832 A1 | 5/2018 | Nania | |
| 2019/0084621 A1 | 3/2019 | Swayne et al. | |
| 2019/0135350 A1 | 5/2019 | Park et al. | |

FOREIGN PATENT DOCUMENTS

| | | | | |
|---|---|---|---|---|
| CN | 110167774 A | | 8/2019 | |
| DE | 102 28 410 A1 | | 1/2004 | |
| DE | 199 56 567 B4 | | 3/2004 | |
| DE | 10333804 B3 | * | 2/2005 | ............. B62D 25/06 |
| DE | 10 2008 033 923 A1 | | 1/2010 | |
| DE | 10 2015 207 910 A1 | | 11/2016 | |
| DE | 10 2015 213 520 A1 | | 1/2017 | |
| DE | 10 2016 009 136 A1 | | 2/2017 | |
| DE | 102016222116 A1 | * | 5/2018 | |
| DE | 10 2017 220 744 B3 | | 1/2019 | |
| DE | 10 2018 211 485 A1 | | 5/2019 | |
| EP | 1 721 769 A1 | | 11/2006 | |
| FR | 2 882 982 A1 | | 9/2006 | |
| FR | 2900624 A1 | * | 11/2007 | ............. B62D 25/06 |
| JP | 2005-153650 A | | 6/2005 | |

OTHER PUBLICATIONS

International Search Report (PCT/ISA/210) issued in PCT Application No. PCT/EP2020/073208 dated Oct. 29, 2020 with English translation (six (6) pages).

German-language Written Opinion (PCT/ISA/237) issued in PCT Application No. PCT/EP2020/073208 dated Oct. 29, 2020 (eight (8) pages).

English translation of Chinese-language Office Action issued in Chinese Application No. 202080061724.0 dated Jul. 14, 2023 (5 pages).

English translation of Office Action issued in Chinese Application No. 202080061724.0 dated Apr. 7, 2023 (five (5) pages).

* cited by examiner

PASSENGER CAR

The invention relates to a passenger car in accordance with the preamble of patent claim 1.

DE 199 56 567 B4 discloses a vehicle roof, with a roof frame which has at least one crossmember and a right-hand and a left-hand side rail, and with at least one openable roof part which is arranged between the side rails. It is provided here that a preassembled roof module which contains the openable roof part is assembled in a non-releasable manner from at least one crossmember and from the two side rails. Moreover, US 2018/0126832 A1 and U.S. Pat. No. 9,862,255 B2 disclose a vehicle with a panorama roof.

It is an object of the present invention to provide a passenger car which can be equipped with at least one transparent roof element in a particularly low-weight and inexpensive way.

According to the invention, this object is achieved by way of a passenger car with the features of patent claim 1. Advantageous developments of the invention can be gathered from the remaining claims.

The invention relates to a passenger car which has a structure in the form of a monocoque vehicle body. The interior compartment of the passenger car is at least partially delimited, for example, by way of the monocoque vehicle body, in the interior compartment of which passenger car occupants such as, for example, the driver of the passenger car can be accommodated. Here, the vehicle body has a roof opening which is delimited toward the outside in the vehicle transverse direction by way of lateral roof rails of the vehicle body. This means that the roof rails are constituent parts of the vehicle body which is also called a shell. The roof opening is delimited toward the right in the vehicle transverse direction by way of a first one of the roof rails, whereas the roof opening is delimited toward the left in the vehicle transverse direction by way of the second roof rail. The roof opening is delimited in the vehicle longitudinal direction, in particular toward the front, by way of a transverse element, also called a crossmember, of the vehicle body. Therefore, the roof rails and the transverse element are constituent parts of the vehicle body, the transverse element extending at least substantially in the vehicle transverse direction. Here, the transverse element is connected, in particular directly, to the roof rails. This means that the transverse element is attached, in particular directly, to the roof rails. To this end, for example, the transverse element is connected directly in an integrally joined manner to the roof rails, it being possible for it to be provided that the transverse element is welded and/or adhesively bonded directly to the lateral roof rails. The respective roof rail is also called a side rail and extends at least substantially in the vehicle longitudinal direction. The roof opening preferably extends at least over the predominant length and therefore at least over more than half of the roof in the vehicle longitudinal direction. Furthermore, it is preferably provided that the roof opening extends over at least the predominant width and therefore over more than half of the width of the roof opening in the vehicle transverse direction.

Moreover, the passenger car has a roof device which is preferably configured separately from the vehicle body, is connected to the vehicle body, and has a frame, also called a roof frame, and at least one or precisely one roof element. The roof element is configured, for example, separately from the frame and separately from the vehicle body, and/or is held directly on the frame. In particular, the roof element is connected directly to the frame and, as a result, is preferably fixed directly on the frame. The roof element can be translucent, that is to say transparent, or else the roof element is opaque. The roof element overlaps at least one part of the roof opening. The roof element preferably overlaps more than half of the length (running in the vehicle longitudinal direction) of the roof opening and/or at least more than half of the width (running in the vehicle transverse direction) of the roof opening. As a result, for example, a particularly large region can be produced which, in particular when the roof element is translucent, can be penetrated by light from the surrounding area of the passenger car in the completely manufactured state of the passenger car and, as a result, can let the light from the surrounding area into the interior compartment of the passenger car. Here, the light from the surrounding area can penetrate the roof element which is, for example, translucent and the roof opening, and can therefore penetrate into the interior compartment, as a result of which a particularly pleasant atmosphere can be produced in the interior compartment.

The roof element which is held directly on the frame is held via the frame on the vehicle body. The roof device is therefore, for example, a roof module which is configured separately from the vehicle body, is held, in particular is fixed, on the vehicle body, and can be assembled or preassembled, for example, independently of the vehicle body and, in the preassembled state, can be mounted in a particularly simple and inexpensive way on the vehicle body, that is to say can be fastened to the vehicle body. In particular, the roof module can be inserted, for example, at least partially into the roof opening. For example, the frame is connected, in particular directly, to the lateral roof rails and/or to the transverse element, in particular is connected in an integrally joined manner and welded and/or adhesively bonded thereto.

In order for it then to be possible for the passenger car to be equipped with the roof device in a manner which is both particularly inexpensive and particularly low in weight, it is provided according to the invention that the frame has at least one transverse frame part which extends, in particular, at least substantially in the vehicle transverse direction and on which the roof element is held directly. To this end, for example, the roof element is connected directly to the transverse frame part, as a result of which the roof element is fixed, for example, directly on the transverse frame part. Moreover, the transverse frame part is connected directly to the transverse element of the vehicle body. The feature that the transverse frame part is connected directly to the transverse element of the vehicle body is to be understood to mean, in particular, that the transverse frame part bears directly against the transverse element or that no further structural element of the vehicle body or of the passenger car is arranged between the transverse frame part and the transverse element. The invention firstly enables the roof device to be equipped as the above-described roof module which can be assembled or manufactured, for example, independently of the vehicle body and therefore at least partially at the same time as the vehicle body, and thereupon can be connected to the vehicle body. As a result, the passenger car can be equipped with the roof device in a particularly inexpensive manner.

Secondly, the invention enables the number of parts and therefore the weight of the passenger car to be kept particularly low, since the transverse frame part is not attached, for instance, via an intermediate component of the vehicle body, but rather is attached directly to the transverse element. Since the transverse element delimits the roof opening toward the front in the vehicle longitudinal direction, the transverse element is a front transverse element. Since the transverse frame part is connected directly to the front transverse element or is attached directly to the front transverse element, the transverse frame part is also called a front transverse frame part. The transverse frame part is a further crossmember of the frame, the transverse frame part extending at least substantially in the vehicle transverse direction. Moreover, high rigidity of the vehicle body can be produced in a manner which is low in weight as a result of the invention, since, for example by virtue of the fact that the transverse frame part is attached directly to the transverse element, the transverse frame part and the transverse element can form a particularly advantageous structural element which is configured, for example, as a profile or profile part and has high rigidity.

In order for it to be possible for the weight to be kept particularly low, it is provided in the case of one embodiment of the invention that the transverse frame part is connected to the transverse element directly in an integrally joined manner, in particular is welded and/or adhesively bonded.

A further embodiment is distinguished by the fact that the roof element is connected directly to the transverse frame part and, as a result, is fixed on the transverse frame part. The feature that a first component such as, for example, the roof element is fixed on a second component such as, for example, in the transverse frame part is to be understood within the context of the invention to mean, in particular, that the components cannot move relative to one another and/or that the components are connected to one another or fixed on one another in such a way that relative movements between the components are avoided. Since it is preferably provided that the roof element is connected directly to the transverse frame part and, as a result, is fixed on the transverse frame part, the number of parts and therefore the costs and the weight of the passenger car can be kept within particularly low limits.

In order for it to be possible for the weight to be kept particularly low here, it is provided in a further refinement of the invention that the roof element is connected to the transverse frame part directly in an integrally joined manner, in particular is welded and/or adhesively bonded.

In the case of one particularly advantageous embodiment of the invention, the transverse element is configured as a shell element, in particular as a lower shell. The shell element per se or as viewed on its own has a hollow cross section which is open per se or as viewed on its own and, for example, is open toward the top in the vehicle vertical direction. The open hollow cross section which is simply also called an open cross section is closed or covered at least in one length region of the shell element, in particular at least predominantly or completely, by way of the transverse frame part, in particular toward the top in the vehicle vertical direction, and, as a result, is supplemented to form a closed hollow cross section. The transverse frame part therefore acts as an upper part or upper shell, since it forms, in particular, the closed hollow cross section with the shell element which is configured, for example, as a lower shell as the abovementioned structural element, for example. As a result, particularly high rigidity of the structural element can be produced in a particularly inexpensive way. Since the shell element and the transverse frame part form the closed hollow cross section, a component which is arranged between the transverse frame part and the shell element for closing the open rear cross section can be avoided, with the result that the number of parts and therefore the weight can be kept low.

In a further refinement of the invention, the passenger car has a windshield which is, in particular, a front and/or translucent windshield, which windshield is preferably translucent and/or delimits the interior compartment of the passenger car at least partially toward the front in the vehicle longitudinal direction. It is provided here that the windshield is connected directly to the transverse frame part. Therefore, no intermediate component is provided between the windshield and the transverse frame part, with the result that the number of parts and therefore the weight can be kept particularly low. In other words, the windshield can be attached in a manner which is particularly low in weight to the transverse frame part and via the latter to the vehicle body.

It has been shown to be particularly advantageous here to realize a particularly low weight if the windshield is connected to the transverse frame part directly in an integrally joined manner, in particular is welded and/or adhesively bonded.

Within the context of the invention, the feature that a first component is connected directly to a second component is to be understood to mean, in particular, that no further component is arranged between the components, but rather the components lie, for example, directly against one another or are connected to one another directly.

Figure 2:
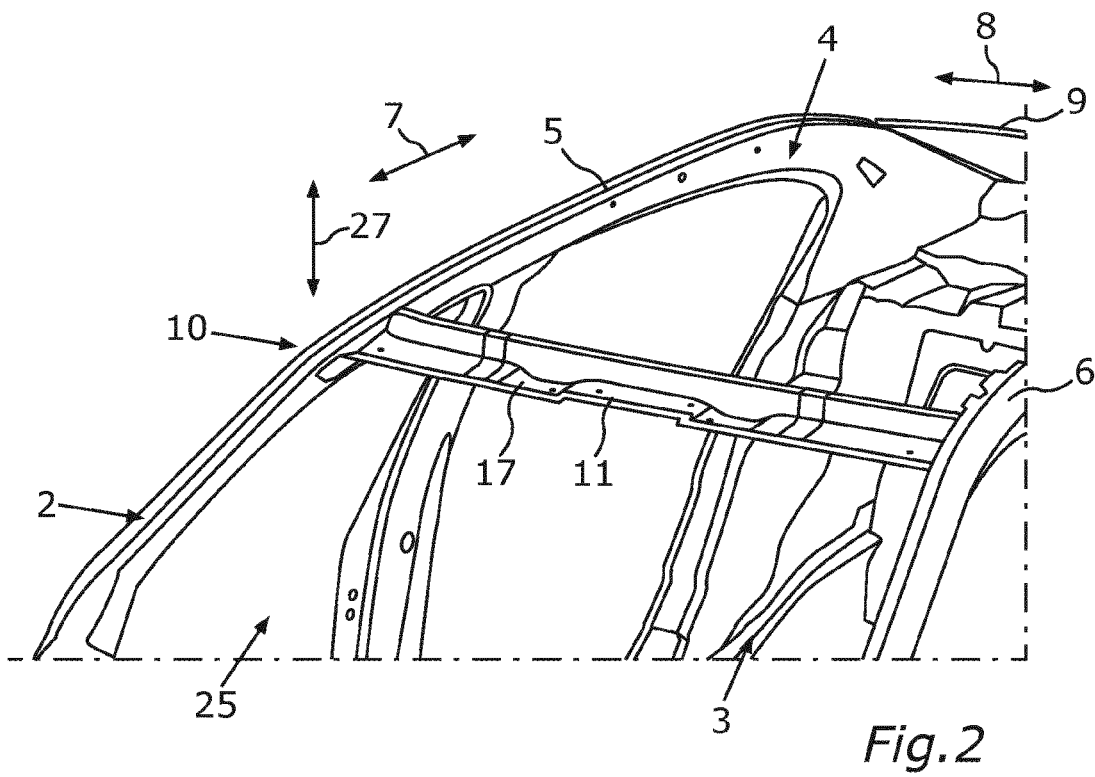

Details of the invention result in the further text on the basis of the description of the figures and the drawing, in which:

FIG. 1 shows details of a diagrammatic and perspective sectional view of a passenger car according to the invention, and FIG. 2 shows details of a diagrammatic perspective view of the monocoque vehicle body of the passenger car.

In the figures, identical or functionally identical elements are provided with identical designations.

FIG. 1 shows details of a sectioned, perspective and diagrammatic view of a passenger car 1 which, as can be seen in combination with FIG. 2, has a structure in the form of a monocoque vehicle body 2. Here, the vehicle body 2 delimits the interior compartment 3 of the passenger car 1 at least partially, it being possible for occupants such as, for example, the driver of the passenger car 1 to be accommodated in the interior compartment 3 of the passenger car 1. It can be seen particularly clearly from FIG. 2 that the monocoque vehicle body 2 has a roof opening 4 which is delimited toward the outside in the vehicle transverse direction on both sides by way of lateral roof rails 5 and 6 (also called side spaces) of the monocoque vehicle body 2. The respective roof rail 5 and 6 extends at least substantially in the longitudinal direction which is illustrated by way of a double arrow 7 in FIGS. 1 and 2. The roof opening 4 is delimited by way of the roof rail 5 toward the right in the vehicle transverse direction in relation to the forward driving direction of the passenger car 1, and the roof opening 4 is delimited by way of the roof rail 6 toward the left in the vehicle transverse direction and in relation to the forward driving direction. Here, the vehicle transverse direction is illustrated by way of a double arrow 8 in FIG. 2. Since the vehicle body 2 has the roof rails 5 and 6, the roof rails 5 and 6 are constituent parts of the vehicle body 2 which is also called a shell. The vehicle body 2 also has a rear, first transverse element 9 which is, for example, a first crossmember of a roof 10 of the vehicle body 2. In other words, the vehicle body 2 comprises the roof 10 which has, for example, the roof rails 5 and 6, the transverse element 9, and a second, front transverse element 11. The transverse elements 9 and 11 are therefore constituent parts of the vehicle body 2, with the result that the vehicle body 2 also has the transverse element 11. Here, the transverse element 11 is a second, front crossmember of the roof 10 and therefore of the vehicle body 2. Here, the roof opening 4 is delimited toward the front in the vehicle longitudinal direction by way of the transverse element 11 of the vehicle body 2. The respective transverse element 9 and 11 extends at least in the vehicle transverse direction and is connected here on both sides, in particular directly, to the roof rails 5 and 6. To this end, for example, the respective transverse element 9 and 11 is connected to the lateral roof rails 5 and 6 directly in an integrally joined manner, in particular is welded directly and/or is adhesively bonded directly.

It can be seen in combination with FIG. 1 that the passenger car 1 also has a roof device 12 which is preferably configured as a roof module. The roof device 12 has a frame 13, of which details of a front transverse frame part 14 which extends at least substantially in the vehicle transverse direction can be seen in FIG. 1. Moreover, the roof device 12 comprises at least one or precisely one roof element 15 which overlaps and therefore covers at least one part of the roof opening 4 toward the top in the vehicle vertical direction. It is provided, in particular, that the entire roof opening 4 is overlapped and therefore covered by way of the roof element 15, in particular toward the top in the vehicle vertical direction. As a result, for example, the roof opening 4 is closed by way of the roof element 15, in particular at least partially, at least predominantly or completely.

The roof element 15 is, for example, translucent, that is to say transparent. Here, the roof element 15 can be formed from a plastic which is, in particular, translucent or else from glass. Furthermore, it is conceivable that the roof element 15 is opaque. It is conceivable here that the roof element 15 is formed from a metallic material, in particular steel or aluminum, or a plastic which is, in particular, opaque. The roof element 15 preferably extends at least over more than half of the length, running in the vehicle longitudinal direction, of the roof opening 4. The roof element 15 preferably extends over the entire length, running in the vehicle longitudinal direction, of the roof opening 4. As an alternative or in addition, the roof element 15 extends at least over more than half of the width, running in the vehicle transverse direction, of the roof opening 4. The roof element 15 preferably extends over the entire width, running in the vehicle transverse direction, of the roof opening 4. Here, the roof element 15 is held directly on the frame, as a result of which the roof element 15 is held on the vehicle body 2 via the frame 13, that is to say by means of the frame 13. As a result, for example, the roof device 12 can be configured as the abovementioned roof module which can be preassembled independently of the vehicle body 2 and, in the preassembled state, can be mounted on the vehicle body 2, in particular on its roof 10. As a result, the passenger car 1 can be equipped particularly inexpensively with the preferably very large roof element 15. It can be seen overall that, by virtue of the fact that the roof element 15 is very large both in the vehicle longitudinal direction and in the vehicle transverse direction, the roof device 12 is, for example, what is known as a panorama roof, with which the passenger car 1 can be equipped particularly inexpensively.

In order, moreover, for it then to be possible for the passenger car 1 to be equipped with the panorama roof in a manner which is particularly low in weight, the frame 13 has the front transverse frame part 14, on which the roof element 15 is held directly. The transverse frame part 14 is connected here directly to the transverse element 11 of the vehicle body 2. It can be seen particularly clearly from FIG. 1 that the transverse frame part 14 which extends at least substantially in the vehicle transverse direction is arranged above the transverse element 11 in the vehicle vertical direction and is placed here, in particular, onto the transverse element 11 from top to bottom in the vehicle vertical direction. The transverse frame part 14 and the transverse element 11 form a structural element 16 of the passenger car, the transverse frame part 14 forming an upper part, in particular an upper shell which is also called a top shell, and the transverse element 11 forming a lower part, in particular a lower shell which is also called a bottom shell, of the structural element 16.

The transverse element 11 and the transverse frame part 14 have, for example, respective joining flanges 17 and 18, via which the transverse element 11 and the transverse frame part 14 are connected to one another directly. It is provided here that the transverse element 11 is fixed directly on the transverse frame part 14 or vice versa, with the result that the transverse element 11 and the transverse frame part 14 are connected to one another in such a way that relative movements between the transverse element 11 and the transverse frame part 14 are avoided. Moreover, it is preferably provided that the roof element 15 is connected directly to the transverse frame part 14 and, as a result, is fixed directly on the transverse frame part 14. Therefore, the roof element 15 and the transverse frame part 14 are preferably connected to one another directly, such that relative movements between the roof element 15 and the transverse frame part 14 and therefore relative movements between the roof element 15 and the vehicle body 2 are prevented or avoided.

In order for it to be possible for the weight to be kept particularly low, it is preferably provided that the transverse frame part 14 is connected to the transverse element 11, in particular via the joining flanges 17 and 18, directly in an integrally joined manner, in particular is welded directly and/or is adhesively bonded directly.

FIG. 1 particularly diagrammatically shows a connecting element 19, by means of which the transverse element 11 and the transverse frame part 14 are connected, in particular via the joining flanges 18, directly to one another, in particular are connected to one another directly in an integrally joined manner. The connecting element 19 is, for example, a joining bead which extends at least substantially in the vehicle transverse direction and along which and by means of which the transverse element 11 and the transverse frame part 14 are connected to one another directly. The joining bead is, for example, an adhesive bead, along which and by means of which the transverse element 11 and the transverse frame part 14 are adhesively bonded to one another directly, in particular via the joining flanges 18. Furthermore, it is conceivable that the joining bead is a welded seam or welded bead, along which or by means of which the transverse element 11 and the transverse frame part 14 are welded directly to one another, in particular via the joining flanges 18.

Moreover, FIG. 1 particularly diagrammatically shows connecting elements 20 and 21 which are spaced apart from one another in the vehicle longitudinal direction. The respective connecting element 20 and 21 is, for example, a joining bead which extends at least substantially in the vehicle transverse direction. By means of the connecting elements 20 and 21, the transverse frame part 14 and the roof element 15 are connected directly to one another and, as a result, are fixed directly on one another. The preceding and following statements with respect to the connecting element 19 can also readily be transferred to the connecting elements 20 and 21. Therefore, the respective connecting element 20 and 21 can be, for example, a joining bead, in particular an adhesive bead or a welded seam or welded bead, along which and by means of which the transverse frame part 14 is welded and/or adhesively bonded directly to the roof element 15.

It can be seen particularly clearly from FIGS. 1 and 2 that the transverse element 11 which is configured as a shell element and in the process as a lower shell has or forms, per se or as viewed on its own, a hollow cross section 22 which, as viewed on its own or per se, is open toward the top in the vehicle vertical direction, the vehicle vertical direction being illustrated by way of a double arrow 27 in FIGS. 1 and 2. Here, the hollow cross section 22 is covered and, as a result, closed at least in a length region of the lower shell and therefore at least partially, in particular at least predominantly or completely, toward the top in the vehicle vertical direction by way of the transverse frame part 14, and is therefore supplemented to form a closed hollow cross section 23, in particular of the abovementioned structural element 16.

Moreover, the passenger car 1 has a front, translucent windshield 24, by way of which the interior compartment 3 is at least partially delimited toward the front in the vehicle longitudinal direction. It can be seen from FIG. 2 that the vehicle body 2 has a windshield opening 25 which is delimited, for example, by way of the transverse element 11 toward the top in the vehicle vertical direction. The windshield 24 is inserted, for example, into the windshield opening 25 and is fixed, in particular at least indirectly, on the vehicle body 2. It is provided here that the windshield 24 is connected directly to the transverse frame part 14 and, as a result, is fixed directly on the transverse frame part 14. FIG. 1 particularly diagrammatically shows a connecting element 26, by means of which the windshield 24 is connected directly to the transverse frame part 14, in particular to the joining flange 17 of the transverse frame part 14. By means of the connecting element 26, for example, the windshield 24 is connected to the transverse frame part 14 directly in an integrally joined manner, in particular is adhesively bonded directly to the transverse frame part 14 and/or is welded directly to the transverse frame part 14. The connecting element 26 can be, for example, a joining bead which extends at least substantially in the vehicle transverse direction. The joining bead is, for example, an adhesive bead or adhesive seam, along which and by means of which the windshield 24 is adhesively bonded directly to the transverse frame part 14. The respective adhesive seam is also called an adhesive bead.

The abovementioned structural element 16 is also called a cowl, the transverse element 11 being a lower part of the cowl. It can be seen overall that the structural element 16 can be produced with a merely low number of parts and therefore inexpensively. At the same time, particularly high rigidity of the structural element 16 can be produced, since the lower shell and the upper shell delimit the closed hollow cross section 23.

The transverse frame part 14 and the transverse element 11 are formed, for example, from a metallic material, in particular a steel. By virtue of the fact that the transverse frame part 14 is connected directly to the transverse element 11, a double structure, for example in the vehicle transverse direction of the passenger car 1, can be avoided. As a result, the number of parts and therefore the weight can be kept low. At the same time, particularly high rigidity can be realized, with the result that particularly high safety can be ensured, for example, in load cases which can occur in the case of accidents. In particular, an excessive deformation of the roof 10 or the vehicle body 2 in the region of the roof 10 can be avoided, in particular when non-connected force loading of the vehicle body 2 in the region of the roof 2 occurs.

LIST OF DESIGNATIONS

1 Passenger car
2 Vehicle body
3 Interior compartment
4 Roof opening
5 Roof rail
6 Roof rail
7 Double arrow
8 Double arrow
9 Transverse element
10 Roof
11 Transverse element
12 Roof device
13 Frame
14 Transverse frame part
15 Roof element
16 Structural element
17 Joining flanges
18 Joining flanges
19 Connecting element
20 Connecting element
21 Connecting element
22 Open hollow cross section
23 Closed hollow cross section
24 Windshield
25 Windshield opening
26 Connecting element
27 Double arrow

What is claimed is:

1. A passenger car, comprising:
a monocoque vehicle body having a roof opening delimited outwardly in a vehicle transverse direction by lateral roof rails of the vehicle body and in a vehicle longitudinal direction by a transverse element, connected to the roof rails, of the vehicle body;
a windshield; and
a roof having a frame and at least one roof element which overlaps at least one part of the roof opening and is held directly on the frame and, via the frame, on the vehicle body, wherein
the frame has a transverse frame part,
the roof element and the windshield are directly connected to the transverse frame part, and
the transverse frame part is connected directly to the transverse element of the monocoque vehicle body.

2. The passenger car according to claim 1, wherein
the transverse frame part is connected to the transverse element directly in an integrally joined manner.

3. The passenger car according to claim 2, wherein
the integrally joined manner is a welded and/or adhesively bonded connection.

4. The passenger car according to claim 1, wherein
the roof element is connected directly to the transverse frame part and, as a result, is fixed on the transverse frame part.

5. The passenger car according to claim 4, wherein
the roof element is welded and/or adhesively bonded to the transverse frame part directly in an integrally joined manner.

6. The passenger car according to claim 1, wherein
the transverse element is configured as a shell element which has an open hollow cross section which is closed at least in one length region of the shell element by way of the transverse frame part and, as a result, is supplemented to form a closed hollow cross section.

7. The passenger car according to claim 1, further comprising:
the transverse element has a flanged concave shape and the transverse frame part is flat and cooperates with the transverse frame part to define a hollow compartment therebetween.

8. The passenger car according to claim 1, wherein
the windshield is welded and/or adhesively bonded to the transverse frame part directly in an integrally joined manner.

9. The passenger car according to claim 1, wherein the at least one roof element overlaps more than half of the length of the roof opening.

10. The passenger car according to claim 1, wherein an edge of the windshield and an edge of the at least one roof element are coplanar.

11. The passenger car according to claim 1, wherein an edge of the windshield and an edge of the at least one roof element are directly adjacent to one another.

\* \* \* \* \*